United States Patent [19]

Weiland

[11] 4,122,730
[45] Oct. 31, 1978

[54] HOUSING FOR A MECHANICAL GEAR ARRANGEMENT

[75] Inventor: Emil Weiland, Hohenbrunn, Germany

[73] Assignee: Messerschmitt-Bölkow-Blohm GmbH, Munich, Germany

[21] Appl. No.: 780,017

[22] Filed: Mar. 22, 1977

[30] Foreign Application Priority Data

Mar. 26, 1976 [DE] Fed. Rep. of Germany ....... 2612937

[51] Int. Cl.² ............................................. F16H 57/02
[52] U.S. Cl. .................................................. 74/606 R
[58] Field of Search .......................... 74/606 R, 606 A; 428/367, 902; 220/63 A

[56] References Cited

U.S. PATENT DOCUMENTS

| | | | |
|---|---|---|---|
| 664,386 | 12/1900 | Davidson | 74/606 |
| 1,484,942 | 2/1924 | Guy | 47/606 X |
| 2,762,232 | 9/1956 | Bade | 74/606 X |
| 3,374,687 | 3/1968 | Vogt | 74/606 X |
| 3,698,587 | 10/1972 | Baker | 220/63 A |
| 3,768,760 | 10/1973 | Jenson | 428/367 |
| 3,995,081 | 11/1976 | Fant | 428/902 |

*Primary Examiner*—N. P. Godici
*Attorney, Agent, or Firm*—Toren, McGeady and Stanger

[57] ABSTRACT

A housing for an arrangement of mechanical gears which includes pairs of meshing gears for transmitting driving force between a drive shaft and a driven shaft. The housing comprises a high strength supporting structure carrying bearings for journaling the respective shafts for each of the gears. The supporting structure includes a plurality of individual bending resistant girder members extending between the bearings journaling the shafts for the gears of each pair of meshing gears. The girders which extend between the bearings correspond to and absorb the reaction forces acting between the bearings. The girders have reinforcing chords made of material which is rigid along the longitudinal direction thereof. A protective skin which is unstressed by the reaction forces encloses the entire arrangement of gears and the supporting structure.

9 Claims, 6 Drawing Figures

HOUSING FOR A MECHANICAL GEAR ARRANGEMENT

BACKGROUND OF THE INVENTION

The invention relates generally to a structure for an arrangement of mechanical gears, and more particularly to such a structure for supporting toothed gears in an aircraft.

Known housings for arrangements of mechanical gears carried on supporting axles or shafts, which are arranged in fixed spatial relationship with each other, normally take the form of substantially closed containers of grey iron or light metal corresponding to the geometric arrangement of the bearings for journaling the axles or shafts of the gears. Such known housings have been provided with stiffening ribs on the inside and/or the outside thereof for the transmission and distribution of the reaction forces acting on the bearings. Such reaction forces can be extremely high because of the high reduction ratios and developing torque of the gear arrangements, particularly when used in aircraft, and can result in localized mixed stresses in the supporting wall areas of the housing because of stress overlap.

In modern type gear arrangements, particularly those known as Novikov gear arrangements, which permit high reduction ratios in highly stressed gearing steps, and which have gear wheels of light weight, the housing must be very stiff and not deform when under load in order to avoid any impairment of the geometric conditions to permit proper gear engagement and to thus avoid any impairment of the load capacity of the gear arrangement. While it might be possible to achieve this objective using housings of the known type, it would require very large wall thicknesses resulting in high material costs and excessive weight, which is particularly undesirable in aircraft. Even if the known housing were to be made of fiber reinforced materials, large wall thicknesses and corresponding high material costs and weight would still result since the known type of housing structure must be formed of a plurality of superimposed layers having different fiber direction because of the anisotropic strength and stiffness properties of such fiber compound materials. Accordingly, the plurality of superimposed layers would still result in increased wall thicknesses and increased weight. Additionally, the known type of housings for gearing arrangements have been difficult to manufacture because of their generally complicated shapes.

It is accordingly the general object of the invention to provide a housing for an arrangement of mechanical gears, particularly of the heavy duty type, which is light in weight yet provides substantially deformation free support of gearing steps even when the gearing steps are highly stressed and have high transmission ratios.

SUMMARY OF THE INVENTION

The present invention accomplishes the foregoing objectives by providing a housing of the above-mentioned type, which is characterized in that it has a supporting structure comprising individual girder members assembled and connected together in a scaffold fashion. The individual girder members extend between and connect the bearings for journaling the axles or shafts of individual gears directly with each other and with the fastening points of the housing. The girders are of a very stiff construction so as to correspond with and absorb the reaction forces acting on them. The housing further includes a protective skin which is unstressed by the reaction forces and which covers and encloses the supporting structure in a sealing manner.

The housing structure is generally divided into the supporting structure assembled from the individual girder members for absorbing and transmitting the reaction forces from the bearings and the protective skin which is unstressed by the reaction forces which serves to seal and protect the supporting structure and the arrangement of gears carried thereby from the outside preventing the penetration into the housing of dirt and other foreign objects and also serving to retain the lubricant within the gear arrangement. The protective skin is relieved from the transmission of reaction forces and can thus be designed with uniform thin walls having an extremely simple shape which is independent of the geometric arrangement of the bearings. The supporting structure is composed of the plurality of individual girder members which are relatively simply shaped and which connect the bearings journaling the axles or shafts for pairs of meshing gears with the shortest distance between them, and in the manner of simple bending resistant girders provides a direct transmission of forces having a flux pattern which is free of interferring overlaps and deflections, the girders having a precisely defined size and direction so as to directly cancel the internal radial reaction forces extending from each of the pairs of meshing gears, each of which defines a gear step.

As a result of the housing having the foregoing design, the invention provides for a highly resistent and rigid support for the bearings journaling the shafts of each of the gears, which is substantially free of deformation in spite of its light weight and low costs of material, even when supporting gearing steps which are highly stressed.

In spite of the supporting structure being formed in a scaffold type of construction from relatively simple individual girder members, further advantages can be achieved by making the supporting structure from highly resistent (although difficult to process) materials, such as beryllium. Because of the homogeneous distribution and direction of the stress within the individual girder members (without stresses extending in different directions), the supporting structure can be made from fiber reinforced materials so that the specific superior properties of such materials can be taken advantage of without requiring numerous layers of such fiber materials, which would result in increased weight. Accordingly, the supporting structure, which is assembled as a frame embracing the various gearing steps, may be formed of fiber material having only one or at least very few unidirectional fiber layers, resulting in a housing having excellent rigidity and strength properties even for heavy duty gear arrangements thereby achieving significant weight savings as compared to prior type housings.

The individual girder members of the present invention are substantially formed of carbon fiber compound materials which insure minimum deformations. These girders may also be formed of carbon fiber compound materials and/or mixed laminates to compensate for thermal expansions. Because of the particularly favorable shape with respect to the load on the girders and the materials from which they are formed, the individual girder members are preferably designed as shearing panels having webs. The girders are made so that the fibers in the chord areas extend longitudinally thereof and in the web areas extend at an angle of approximately ±45° thus crossing other fibers.

A further feature of the present invention is to provide a separate support housing structure separated both constructionally and functionally from the supporting structure for transmitting external forces such as from the rotor of a helicopter, so that the favorable homogeneous stress distribution within this supporting structure will not be impaired.

Additionally, the protective skin of the housing of the present invention can be provided with a plastic cover and may also contain a self sealing bubble or membrane to prevent leakage of lubricant from the housing through any openings in the housing which may be caused by penetration of a foreign body, which might result during military use. Further, the protective skin may be provided with ribs in order to insure the dissipation of heat and to insure proper cooling of the lubricant within the housing.

BRIEF DESCRIPTION OF THE DRAWINGS

The invention will be described more fully hereinafter in connection with the following drawings, in which.

DESCRIPTION OF THE INVENTION

Figure 1:
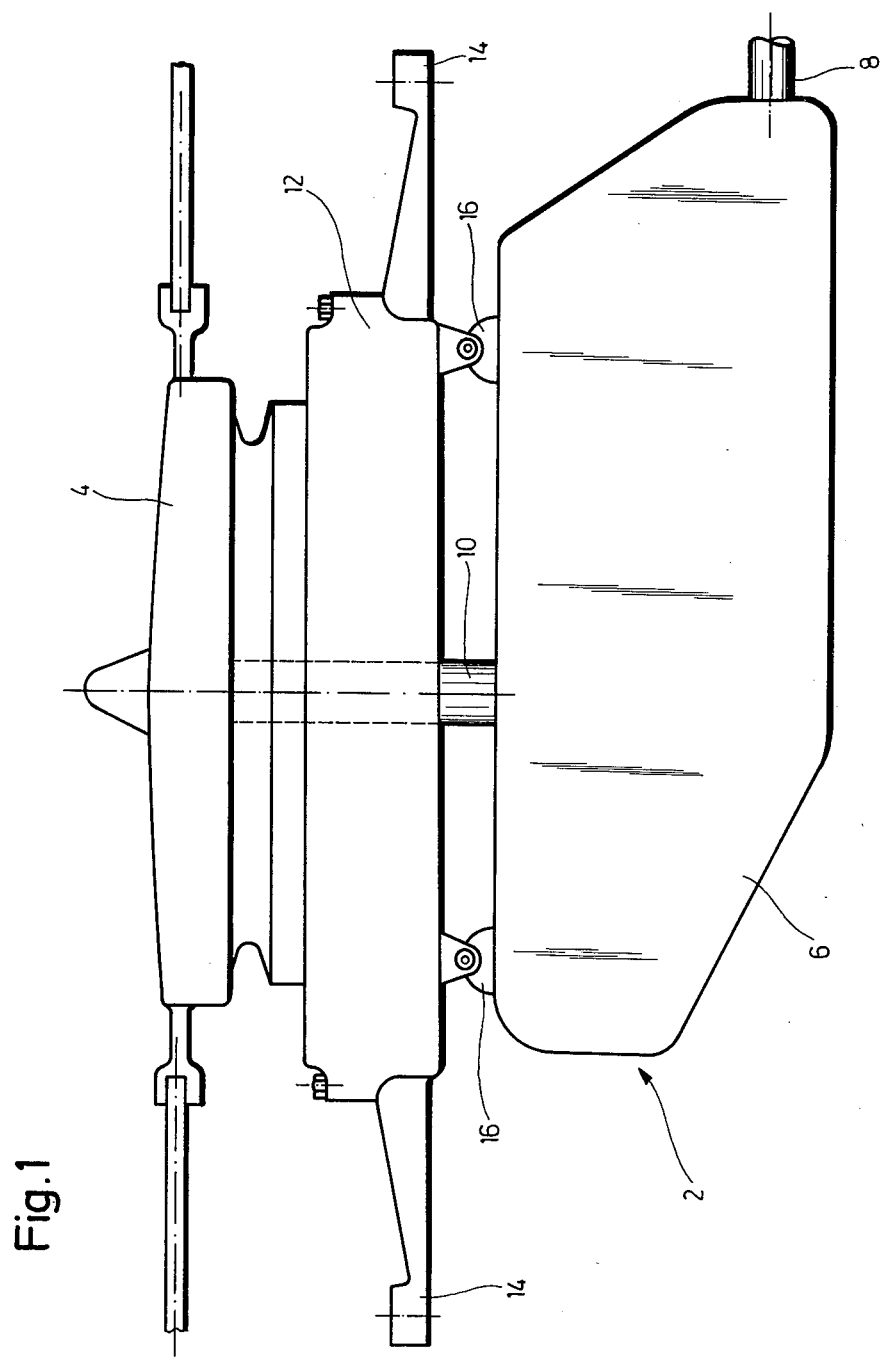
FIG. 1 is an elevational view in schematic form showing a housing for a gearing arrangement for driving and supporting a rotor head.

Referring now in more detail to the accompanying drawings, FIG. 1 shows a gearing unit 2 which supports and drives a helicopter rotor head 4. The gear unit 2 comprises a housing and an arrangement 6 of toothed gears with a drive shaft 8 and a driven shaft 10 which connects with the rotor head 4. A bearing housing 12 is physically separated from the gear unit 2 and houses the bearing for the rotor head 4. The bearing housing 12 further serves to transmit the external forces exerted by the rotor on the gear unit 2 directly to the helicopter frame (not shown) over supporting arms 14 without transmitting these forces through the gearing arrangement 6. The gear arrangement 6 is suspended from the bearing housing 12 by fastener lugs 16 through which reaction forces will be transmitted. The bearing housing is in turn supported on the helicopter frame by supporting arms 14 through which reaction forces can be transmitted to the frame.

Figure 2:
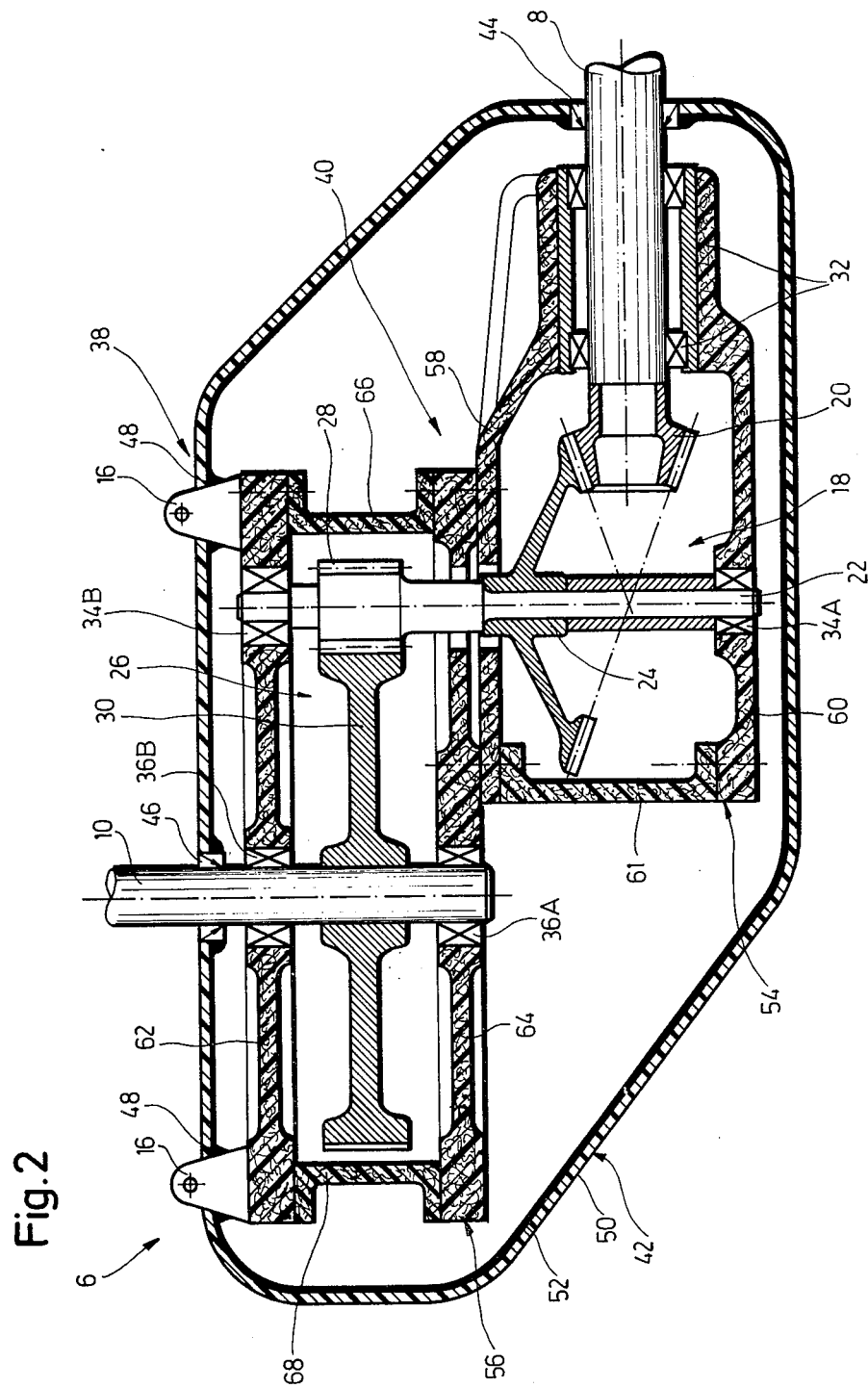
FIG. 2 is a sectional view through the housing shown in FIG. 1 and showing the arrangement of gears within the housing.

The gear arrangement 6 as shown in FIG. 2 includes a bevel gear step, indicated generally by reference numeral 18 and a spur gear step indicated by reference numerals 26. The bevel gear step 18 includes a bevel gear 20 secured on the drive shaft 8 and a bevel gear wheel 24 arranged on an intermediate shaft 22. The spur gear step 26 is arranged subsequent to the bevel gear step 18 and includes a pinion 28 carried on the intermediate shaft 22 and a spur gear 30 arranged for meshing engagement with the pinion 28. The spur gear 30 is fixedly secured to the driven shaft 10.

The drive shaft 8 is supported in bearings 32, the intermediate shaft 22 is supported in bearings 34A and 34B and driven shaft 10 is supported in bearings 36A and 36B. The reaction forces resulting from engagement of the various gear teeth under load are therefore transmitted over the various bearings of each of the shafts to the housing of the gear arrangement generally designated by reference numeral 38. The housing 38 includes a rigid high strength supporting structure 40 which carries the respective bearings and supports shafts 8, 22 and 10 in their respective bearings substantially without deformation. The supporting structure 40 serves to transmit the reaction forces resulting from engagement of the meshing gears and resultant torque deflection to the fastener lugs 16. Further more, the housing 38 includes a protective skin 42 which is relieved of gearing forces. The protective skin 42 embraces or completely surrounds the supporting structure 40 and serves to prevent any penetration of dirt or other foreign objects into the housing and to help maintain proper lubricant within the gear arrangement 6. FIG. 2 shows the supporting structure 40 in sectional view illustrating the scaffold construction so that its structure may be more readily understood.

The protective skin 42 carries lubricant packings 44, 46 and 48 in the areas surrounding shafts 8 and 10 and fastener lugs 16 respectively which extend outwardly from the protective skin. The protective skin 42 generally consists of an outer container 50, preferably made of thin plastic, which is lined with an inner self-sealing bubble 52 of rubber-like material. The bubble 52 is designed so as to automatically close about any openings therein as a result of its elastic properties thus preventing any lubricant carried in the gear arrangement from escaping from the housing when an opening is formed in the protective skin such as a result of being penetrated by a projectile which might occur when the helicopter is used for military purposes. In order to help dissipate heat and thus cool the lubricant, a plurality of ribs may be formed on the outside of the protective skin 42.

The supporting structure 40 includes rectangular supporting frames 54 and 56 which are connected together such as by screws. Frame 54 is associated with bevel gear step 18 and frame 56 is associated with spur gear step 26. The respective supporting frames assume the support of the bearing forces acting on each of the gearing steps.

Supporting frame 54 is composed of two longitudinal girders 58 and 60 and a transverse girder 61. Supporting frame 56 is composed of two longitudinal girders 62 and 64 and two transverse girders 66 and 68. The longitudinal girder 62 of the supporting frame 56 carries the fastener lugs 16. The individual girders are screwed together with each other, as schematically illustrated in FIG. 2, however, they may also be connected with each other in any suitable manner. The girders are designed so that they connect the bearings 32, 34 and 36 with each other in the shortest path corresponding to the size and direction of the forces acting between the bearings, so that the radial forces acting on each of the gear steps 18 and 26 respectively will directly cancel each other out without any undesirable deflection forces, so that the individual girders correspond to the occurring load, assure high strength and rigidity in a simple form with a homogeneous flux of forces precisely defined in size and direction. The uniform stress distribution and direction in the individual girders 58 through 68 permits a simple manufacture of the supporting frames from fiber compound materials with the reinforcing fibers of the materials extending in the direction of the stress distribution. Consequently, a light weight structure may be provided by taking advantage of the desirable properties of such fiber materials, while avoiding angular deviations between the forces acting through the material forming the supporting structure 40 and the direction in which the fibers extend (of more than about 10°), as a result of mixed stresses extending in several different directions.

The transverse girders 61, 66 and 68 have a substantially U-shaped cross section while the longitudinal girders 58, 60, 62 and 64 are designed in the form of shearing panel girders having substantially T-shaped or multiple T-shaped cross sections.

FIGS. 3 through 6 show the two longitudinal girders 58 and 64 in the form of a one part or unitary construction from a fiber compound material in which carbon fibers are used for maximum strength and minimum deformation. Mixed laminates may also be used to compensate for thermal expansion. Because of the simple structure of the individual girders, they may easily be manufactured from other types of high strength materials such as beryllium, which are usually difficult to process but which may simplify the manufacturing of the girders.

Figure 3:
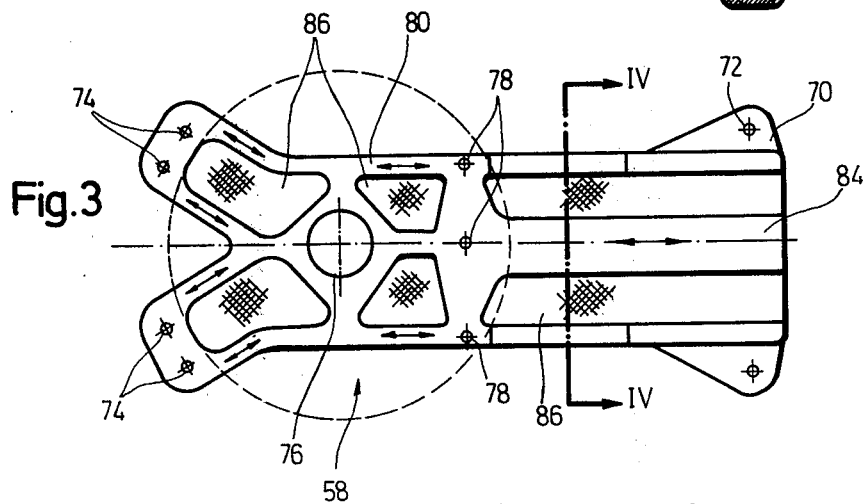
FIG. 3 is a plan view of one of the girders used in accordance with the present invention.
Figure 4:
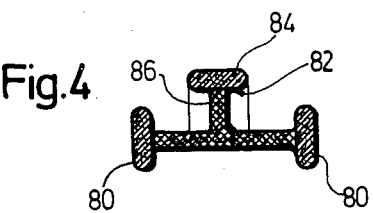
FIG. 4 is a sectional view taken along lines IV—IV of FIG. 3.

As indicated in FIGS. 3 and 4, longitudinal girder 58, which is stressed for shear and tension forces, and which is associated with the bevel gear step 18 may be provided with tongues 70 and fastening holes 72 on the end thereof for receiving the bearings 32. The tongues 70 with fastening hole 72 are arranged for connection with a second longitudinal girder 60 of the bevel gearing step 18. The girder 58 is further provided with a pair of arms (in a bifurcated manner) at the other end thereof which also carry fastening holes 74 for connection with transverse girder 61 and with longitudinal girder 64 which is associated with the spur gear step 26. A reinforced central opening 76 is provided on the girder 58 for receiving intermediate shaft 22 of the bevel wheel 24. A third set of fastening holes 78 is provided for connection of girder 58 with longitudinal girder 64.

As will be appreciated from FIG. 2, girder 58 is bent intermediate its ends so that the stress distribution points may be connected with each other through the shortest possible distance. With reference to FIGS. 3 and 4, girder 58 is provided on its outer edge with a reinforcing chord 80 which extends inwardly to and around the central opening 76 and to the fastening holes 78 in spoke-like fashion. An upright rib 86 having a substantially T-shaped cross section with a reinforcing rib 84 is molded on the girder 58 and extends from one end of the girder through the bent area thereof. The upright rib 86 provides reinforcement against the transverse loads acting from bearings 32 and merges in the range of the fastening holes 78 into the reinforcing chord 80. The reinforcing fibers of the material forming the girder extends through the chords 80 and 84 in a substantial longitudinal direction thereof, as indicated by the arrows shown in FIG. 3 so as to correspond to the loads supported by the girders. The reinforcing fibers in the thin-walled shear-stressed web regions 86 of the upstanding rib extending between the chords 80 and 82 are arranged in an intersecting manner so that they extend inclined by plus or minus 45 degrees with respect to the longitudinal direction of the chords, as is indicated in FIGS. 3 and 4 by the cross hatching.

Figure 5:
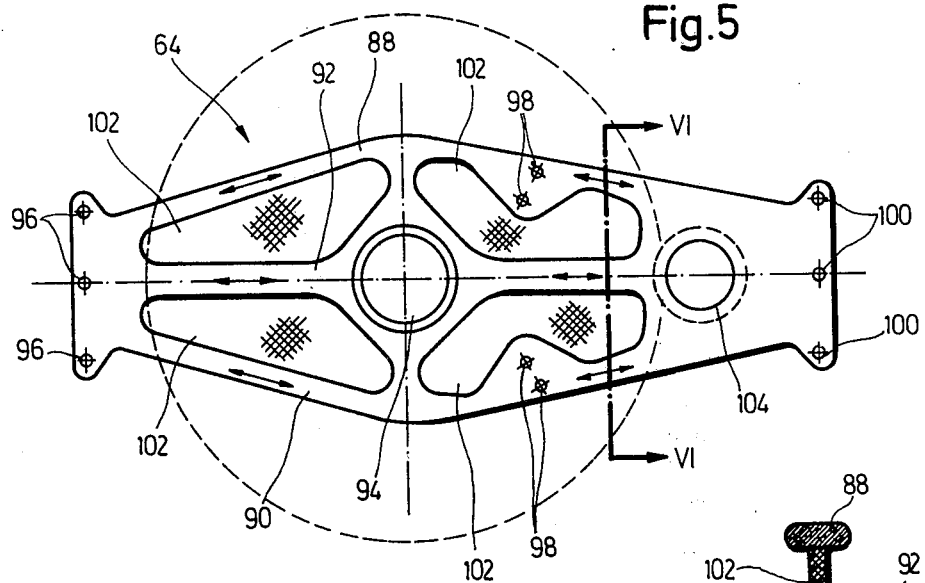
FIG. 5 is a view similar to that of FIG. 3 showing another of the girders used in the housing according to the present invention.
Figure 6:
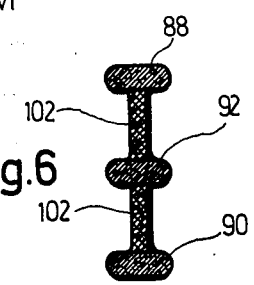
FIG. 6 is a sectional view taken along lines VI—VI of FIG. 5.

The longitudinal girder 64 shown in FIGS. 5 and 6 is also designed as a shearing panel girder and is similarly made of fiber compound material. Girder 64 includes an upper chord 88, a lower chord 90 and a central chord 92. The arrangement of chords is provided to insure a rigid high strength construction of the girder between its load distribution points which are located at a central opening 94 for receiving drive shaft bearing 36A, the fastening holes 96, by which the girder 64 may be connected with transverse girder 68, the fastening holes 98 for connecting girder 64 with girders 58 and 61, and the fastening holes 100 for connecting the girder with girders 58 and 66. As with girder 58, the reinforcing fibers in the chords 88, 90 and 92 of girder 64 extend in the longitudinal direction. The fibers in the intermediate thin-walled, substantially shearstressed web regions 102 extend in a direction inclined by plus or minus 45 degrees with respect to the longitudinal chord direction so as to intersect with each other, again as is indicated by the cross hatching shown in FIG. 6.

The peripheral edge of the spur gear 30 is shown in broken line in FIG. 5 and positioned coaxially with opening 94. The peripheral edge of pinion 28 is similarly indicated in broken line and shown as being arranged coaxially with the opening 104 in the girder 64 which is provided for receiving intermediate shaft 22.

While the invention has been described and illustrated with respect to certain embodiments which produce satisfactory results, it will be appreciated by those skilled in the art, after understanding the purposes of the invention that various additional changes and modifications may be made without departing from the spirit and scope of the invention, and it is therefore intended in the appended claims to cover all such changes and modifications.

What is claimed is:

1. A housing particularly for an arrangement of sets of meshing toothed gears defining gear steps for transmitting a drive force between a drive shaft and a driven shaft, said housing comprising a high-strength supporting framework structure carrying bearings journaling respective shafts for each of the gears of said gear steps, said framework structure arranged for absorbing and corresponding to reaction forces acting between said bearings, and a non-metallic protective skin unstressed by said reaction forces enclosing said arrangement of meshing gears and said supporting framework structure, said supporting framework structure comprising a plurality of individual bending-resistant girder members, each girder member extending in beam-like fashion between two bearings of a pair of gears journaling said shafts of said gear sets for absorbing said reaction forces acting between said bearings, said bending-resistant girder members having reinforcing chords made of material which is highly rigid along the longitudinal direction of said chords.

2. The housing according to claim 1 wherein said individual girder members are made of fiber compound material.

3. The housing according to claim 2 wherein said individual girder members are made of carbon fiber compound material.

4. The housing according to claim 2 wherein said individual girder members are made of mixed laminates of fiber compound material.

5. The housing according to claim 2 wherein said individual girder members have webs extending between and connecting said reinforcing chords, the fibers of said fiber compound material extending in substantially the longitudinal direction along said chords, the fibers of said fiber compound material within said webs extending in a direction inclined by plus or minus 45° with respect to the longitudinal axis of said chords, said fibers in said webs thereby intersecting with each other at an angle of approximately 90°, said girder members acting as shearing panel girders.

6. The housing according to claim 1 further comprising a separate support housing connected with said supporting framework structure for transmitting external forces acting on said housing away from said arrangement of sets of meshing toothed gears.

7. The housing according to claim 1 wherein said protective skin comprises an outer container of thin plastic material.

8. The housing according to claim 1 wherein said protective skin carries a self-sealing bubble.

9. The housing according to claim 1 wherein said protective skin has a ribbed outer surface.

* * * * *